(No Model.)
A. HOSKING.
TELLURIAN.
No. 427,868. Patented May 13, 1890.
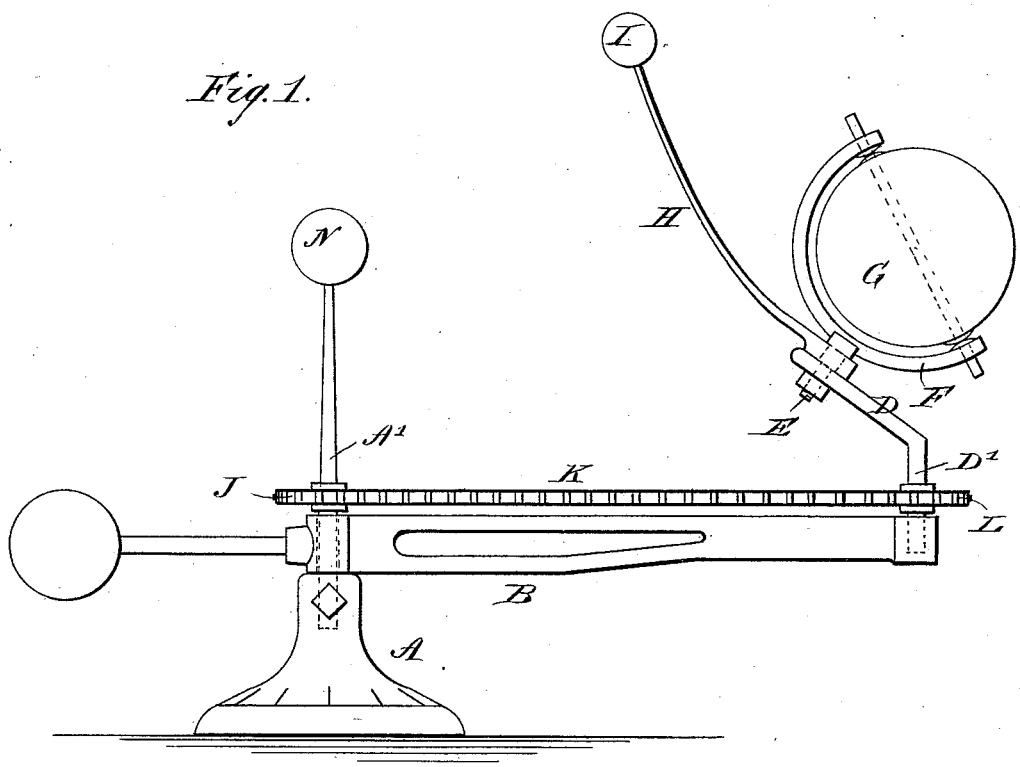
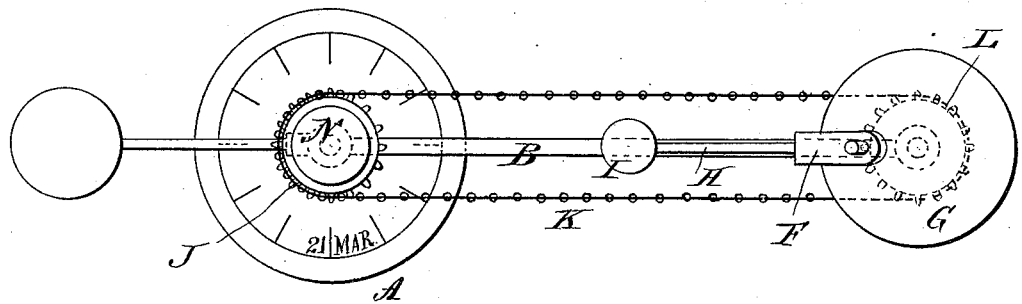
WITNESSES:
INVENTOR:
A. Hosking
BY Munn & Co.
ATTORNEYS.

UNITED STATES PATENT OFFICE.

ALFRED HOSKING, OF AUCKLAND, NEW ZEALAND.

TELLURIAN.

SPECIFICATION forming part of Letters Patent No. 427,868, dated May 13, 1890.

Application filed June 20, 1889. Serial No. 314,901. (No model.) Patented in New Zealand December 10, 1888, No. 3,445.

*To all whom it may concern:*

Be it known that I, ALFRED HOSKING, of Auckland, New Zealand, have invented a new and Improved Tellurian, (for which I obtained Letters Patent in New Zealand on December 10, 1888, No. 3,445,) of which the following is a full, clear, and exact description.

The object of the invention is to provide a new and improved tellurian which in a very simple and effective manner shows the motion of the earth around the sun and that of the moon around the earth.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of the improvement, and Fig. 2 is a plan view of the same.

On a suitably-constructed base A is secured a post A', on which is mounted to turn a counterbalanced horizontally-extending arm B, on the outer end of which is mounted to turn a vertical shaft D', provided at its upper end with an inclined arm or bracket D, on which is secured a stud E, standing at right angles to the arm D, provided with a segmental arm F, in which is mounted to turn a globe G, representing the earth. The axis of this globe is inclined to the vertical post A' and the shaft D'. On the stud E, between the top of the arm D and the segmental arm F, is held to turn a curved arm H, carrying at its outer end a globe I, representing the moon. The center of the globe G is in the axial line of the stud E. On the post A', above the arm B, is secured a sprocket-wheel J, over which passes a sprocket-chain K, also passing over a sprocket-wheel L of the same diameter as the sprocket-wheel J, and secured on the shaft D'. Thus when the arm B is turned once around the post A' the sprocket-chain K, on account of passing over the fixed sprocket-wheel J, causes the sprocket-wheel L to turn once, so that one revolution is given to the inclined arm D for every revolution of the arm B. On the upper end of the post A' is held a fixed globe N, representing the sun and located opposite the globe G. The circular base A is provided with a graduation indicating the different seasons of the year.

The operation is as follows: When the operator turns the arm B once around the post A', then the arm D makes one revolution, as before described, thus carrying the globe G once around the sun N. It will be seen that the arm D, on account of revolving once for one revolution of the arm B, carries the axis of the globe G always parallel to its former position. Thus when the arm B is turned around the post A' the globe G, representing the earth, makes a movement similar to that of our earth around the sun, and the moon-globe F, when its arm H is turned, travels around the earth in a manner similar to the natural movement of the moon around the earth. The arms B and H may be turned at pleasure. It will further be seen that the four seasons of the year can thus be easily demonstrated on the globe G.

Having thus fully described my invention, I claim as new and desire to secure by Letters Patent—

1. In a tellurian, the combination, with a fixed post, of an arm B turning freely on said post, a rotary shaft D', mounted on arm B and having an inclined arm D, a stud-bolt E, passing through the outer end of the arm D, a segmental arm F, fixedly secured to the upper end of the stud-bolt, the globe G, and an adjustable curved arm H, mounted at its lower end on the stud-bolt between the segmental arm and upper face of arm D and carrying a moon-globe I, whereby by loosening the stud-bolt the arm H may be adjusted and held in its adjusted position by tightening said bolt, substantially as set forth.

2. A tellurian consisting in the post A', having a sprocket-wheel J, the graduated base A, the sun-globe N at upper end of said post, the horizontal arm B, turning on said post, the vertical shaft D′, having an inclined arm D and a sprocket-wheel L, the stud-bolt E, passed through the outer end of the arm D and threaded at its lower end, the segmental arm F on the upper end of said stud-bolt and carrying globe G, the curved arm H on the stud-bolt E and provided with a moon-globe I, a nut on the lower end of the stud-bolt for clamping the arm H in any desired position, and the chain K, connecting said sprocket-wheels, substantially as set forth.

ALFRED HOSKING.

Witnesses:
EDWARD HOSKING,
    *Law Student, Auckland.*
HENRY WHITE,
    *Law Stationer, Auckland.*